(12) United States Patent
Njedjou et al.

(10) Patent No.: US 7,924,744 B2
(45) Date of Patent: Apr. 12, 2011

(54) ASSOCIATION OF A MULTI-ACCESS TERMINAL TO A COMMUNICATION NETWORK

(75) Inventors: Eric Njedjou, Rennes (FR); Philippe Bertin, Acigne (FR)

(73) Assignee: France Telecom, Paris (FR)

( * ) Notice: Subject to any disclaimer, the term of this patent is extended or adjusted under 35 U.S.C. 154(b) by 796 days.

(21) Appl. No.: 11/662,687

(22) PCT Filed: Sep. 8, 2005

(86) PCT No.: PCT/FR2005/002245
§ 371 (c)(1),
(2), (4) Date: Mar. 13, 2007

(87) PCT Pub. No.: WO2006/030116
PCT Pub. Date: Mar. 23, 2006

(65) Prior Publication Data
US 2007/0268840 A1    Nov. 22, 2007

(30) Foreign Application Priority Data

Sep. 13, 2004 (FR) .................................. 04 52027

(51) Int. Cl.
*H04L 12/28* (2006.01)
*H04L 12/66* (2006.01)
*H04B 1/38* (2006.01)

(52) U.S. Cl. ......................... 370/254; 370/355; 455/73

(58) Field of Classification Search .................. None
See application file for complete search history.

(56) References Cited

U.S. PATENT DOCUMENTS

| 6,873,611 | B2* | 3/2005 | Rios ............................... 370/338 |
| 2003/0134642 | A1* | 7/2003 | Kostic et al. .................. 455/450 |
| 2003/0224797 | A1* | 12/2003 | Kuan et al. ..................... 455/446 |

FOREIGN PATENT DOCUMENTS

WO    WO 03/091900 A    11/2003

OTHER PUBLICATIONS

Gopal et al., "Policy based access router selections and context transfers in mobile IP networks", Conference on Network Control and Engineering for Quality of Service, Security and Mobility, pp. 3-14, Oct. 23, 2002.
Mahonen et al., "Platform-Independent IP Transmission over Wireless Networks: The Wine Approach", IEEE Personal Communications, IEEE Communications Society, vol. 8, No. 6, pp. 32-40, Dec. 2001.
Shankar et al., "QoS Signaling for Parameterized Traffic in IEEE 802.11E Wirless LANs", Lecture Notes in Computer Science, New York, vol. 2402, pp. 67-83, Aug. 2002.

* cited by examiner

*Primary Examiner* — Salman Ahmed
*Assistant Examiner* — Blanche Wong
(74) *Attorney, Agent, or Firm* — Cohen Pontani Lieberman & Pavane LLP

(57) ABSTRACT

A method of associating a multi-access terminal (STA) with a communications network. The method includes sending data about the connection of the terminal to other networks from the terminal to an access point (AP) of the network.

26 Claims, 5 Drawing Sheets

T1

| Description of subtypes |
|---|
| Association request |
| Association response |
| Re-association request |
| Re-association response |
| ... |
| Authentication |
| De-authentication |

| Order | Field |
|---|---|
| 1 | Access technology type |
| 2 | GMM context type |
| 3 | PDP type |
| 4 | PDP context state |
| 5 | Requested quality of service profile |
| 6 | Negotiated quality of service profile |
| 7 | Mobile network identity |

Fig. 4

| Status code | Meaning |
|---|---|
| 0 | Request accepted |
| 1 | Unspecified error |
| 2-9 | Reserved values |
| 10 | The capacities required by the terminal cannot be supported |
| 12 | Association refused for a reason outside scope of standard |
| 13-16 | Association refused because of failure of authentication |
| 17 | Association refused because the access point cannot manage any more associated terminals |
| 18 | Association refused because the terminal does not support all the required bit rates |
| 19 | Reserved value |
| 20 | Association refused because the terminal is already associated with another access network that is providing a better connection than the access point can provide |
| 21 | Association refused because the terminal is already associated with another access network, and the services that the terminal is using or wishes to use do not need a connection offering a better quality of service than that provided already on the other access network |
| 22 - 65535 | Reserved values |

T3

ST1 brackets rows 20–21

| Order | Field |
|---|---|
| 1 | Access network capacities |
| 2 | Listening interval |
| 3 | Proposed services identifier |
| 4 | Bit rates supported |
| 5 | Access technology type |
| 6 | GMM context state |
| 7 | PDP type |
| 8 | PDP context state |
| 9 | Requested quality of service profile |
| 10 | Negotiated quality of service profile |
| 11 | Mobile network identity |

ST2 brackets rows 1–4
ST3 brackets rows 5–11

ASSOCIATION OF A MULTI-ACCESS TERMINAL TO A COMMUNICATION NETWORK

This is a U.S. National Phase Application under 35 USC 371 of International Application PCT/FR2005/002245 filed on Sep. 8, 2005.

FIELD OF THE INVENTION

The present invention relates generally to access networks in the field of telecommunications and in particular to the access network association procedures used by terminals, which may be multi-access terminals.

BACKGROUND OF THE INVENTION

Because of the coexistence of diverse access networks (cellular networks, wireless local area networks), mobile terminals must increasingly be associated with more than one access network. There quickly arises the question of the best access technology to use, as a function of the requirements of users, the intrinsic characteristics of the technologies concerned, and dynamic information such as the loads on the access networks.

At present, when a multi-access terminal wishes to be connected to a new access network, for example an IEEE 802.11 type access network, information to the effect that the terminal is already connected to a first access network (for example a UMTS access network) could be stored in a mobility manager, generally situated either in the core network of one of the access networks or externally of the access networks. To do this, the mobility manager would have to maintain databases containing data on all the terminals and their association with different networks.

However, an access point may need such information for a specific terminal requesting to be associated with it, for example if an operator has a plurality of access networks and wishes to control the resources used in each of them. The access point does not have direct access to this information at the time of the association request.

Consequently, an access point cannot take account of information about the association of a terminal with other access networks when deciding to accept or reject an association request from a terminal. Admitting a terminal to an access point requires resources for servicing the terminal to be allocated or provisioned. Information about the association of a terminal with other access networks enables the access point to manage its resources better by not admitting terminals that could use resources other than those of that access point, in order to be able to service other terminals that have requirements that can be serviced by that access point alone.

OBJECTS AND SUMMARY OF THE INVENTION

An object of the present invention is to solve the problems of the prior art by providing a method of informing an access point discovered by a terminal about any prior associations of that terminal with one or more other networks.

To this end, the invention proposes a method of associating a multi-access terminal with a communications network, the method being characterized in that it includes sending data about the connection of the terminal to other networks from the terminal to an access point of the network.

This enables the access point with which association is requested to make an informed decision concerning admission in the light of this information about the connection of the terminal to other networks. For example, the access point may not admit the terminal if quality of service information about the connection to the terminal's current access point fails to confirm that the terminal needs to be associated with a new access point. The admission decision is made before or during the association procedure. This enables the access point to carry out an admission check before undertaking any other procedure.

The invention improves management of access network selection for multi-access terminals. It applies in particular to terminals requesting association with wireless local area networks conforming to the IEEE 802.11 standard.

According to a preferred feature of the invention, data regarding the connection of the terminal to other networks is sent in the MAC layer. Thus the access point can make an informed admission decision without needing to access a mobility manager in the core network.

According to a preferred feature of the invention, said data is sent using MAC layer management frames. This enables re-use of the structure and functions of the MAC layer management frames to implement the invention.

In a first implementation of the invention, a MAC layer management frame of a specific subtype is used to convey said data from the terminal to the access point. This enables the invention to be implemented simply.

In a second implementation of the invention, a request frame associated with the MAC layer is used to convey said data from the terminal to the access point. There is therefore relatively little increase in signaling between the terminal and the access point.

According to a preferred feature of the second implementation, said data is inserted into subfields added to the association request frame.

According to a preferred feature of the invention, the access point uses said data to reject or to accept an association request from the terminal.

According to another preferred feature of the invention, if the association request is rejected because of the terminal's other connections, the access point sends the terminal an association response frame containing a cause of error depending on said data. The terminal can therefore use this information subsequently for its mobility decisions.

The invention also provides an association device that includes means for implementing the features of the above invention.

The invention further provides a computer program that includes instructions for implementing the features of the above invention.

The device and the computer program have advantages analogous to those of the method.

BRIEF DESCRIPTION OF THE DRAWINGS

Other features and advantages of the invention become apparent on reading the description of preferred implementations of the invention given with reference to the figures, in which:

FIG. 2 represents management frame subtypes;

FIG. 4 represents subfield values of the frame body field of the FIG. 3 management frame;

FIG. 5 represents subfield values present in a response frame in accordance with the invention;

FIG. 7 represents subfield values present in an association request frame in accordance with the second implementation of the invention.

DETAILED DESCRIPTION OF THE DRAWINGS

Figure 1:
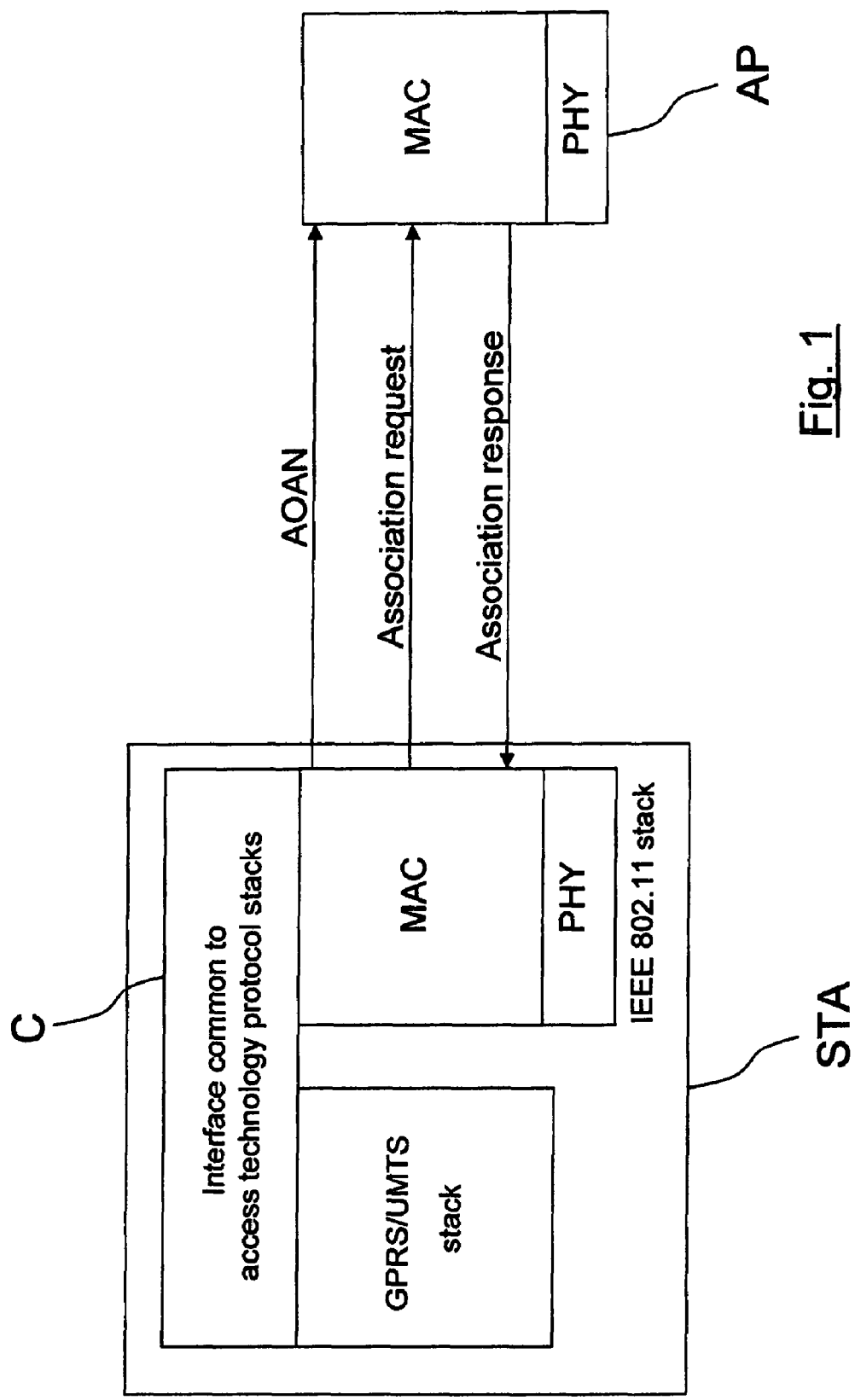
FIG. 1 represents a terminal and an access point of a first implementation of the invention.

In a first implementation of the invention represented in FIG. 1, a multi-access terminal STA connected to a UMTS (Universal Mobile Telecommunications System) radio access network enters the radio coverage of a wireless local area network that conforms to the IEEE 802.11 standard and that includes access points AP, one of which is represented in FIG. 1.

The 802.11 technology enables wireless connection of terminals equipped with a specific card to IP networks. Radio frames are relayed from the terminal to the IP network via a base station called the access point.

It is assumed that the multi-access terminal STA has a mechanism enabling each of its access technologies to transfer parameters, events, and states to a layer or an interface C common to all the access technologies. This enables an access network connection request procedure to use information from protocol stacks of other access technologies present in the terminal.

The terminal STA detects the coverage of the IEEE 802.11 network by virtue of receiving Beacon frames broadcast by the access point AP. It is assumed that the terminal executes a procedure for associating it with the access point AP. In order to be associated with the radio access point, the terminal uses specific MAC (Medium Access Control) level frames. These management type frames contain information such as the MAC address of the access point AP, its capacities, and its SSID (Service Set IDentifier).

According to the invention, the terminal sends to the access point information about its connection to other networks. For this purpose, in the first implementation of the invention, it uses an MAC 802.11 management frame of a new AOAN (Availability Of Other Access Networks) subtype.

Referring to the Table T1 in FIG. 2, the MAC 802.11 frame management category includes a plurality of subtypes, each of which corresponds to a specific function effected by an MAC frame. For example, these subtypes define an association request and an association response used by the procedure for associating the terminal with the network.

The new subtype AOAN can be identified at will from one of four values reserved from the permutation of the four bits describing each subtype. Its function is to inform the access point AP with which the terminal STA is requesting association that the terminal concerned is also connected to other access networks (for example cellular networks). The terminal sends a management MAC frame of the AOAN subtype before initiating the procedure for associating it with the access point AP.

Figure 3:
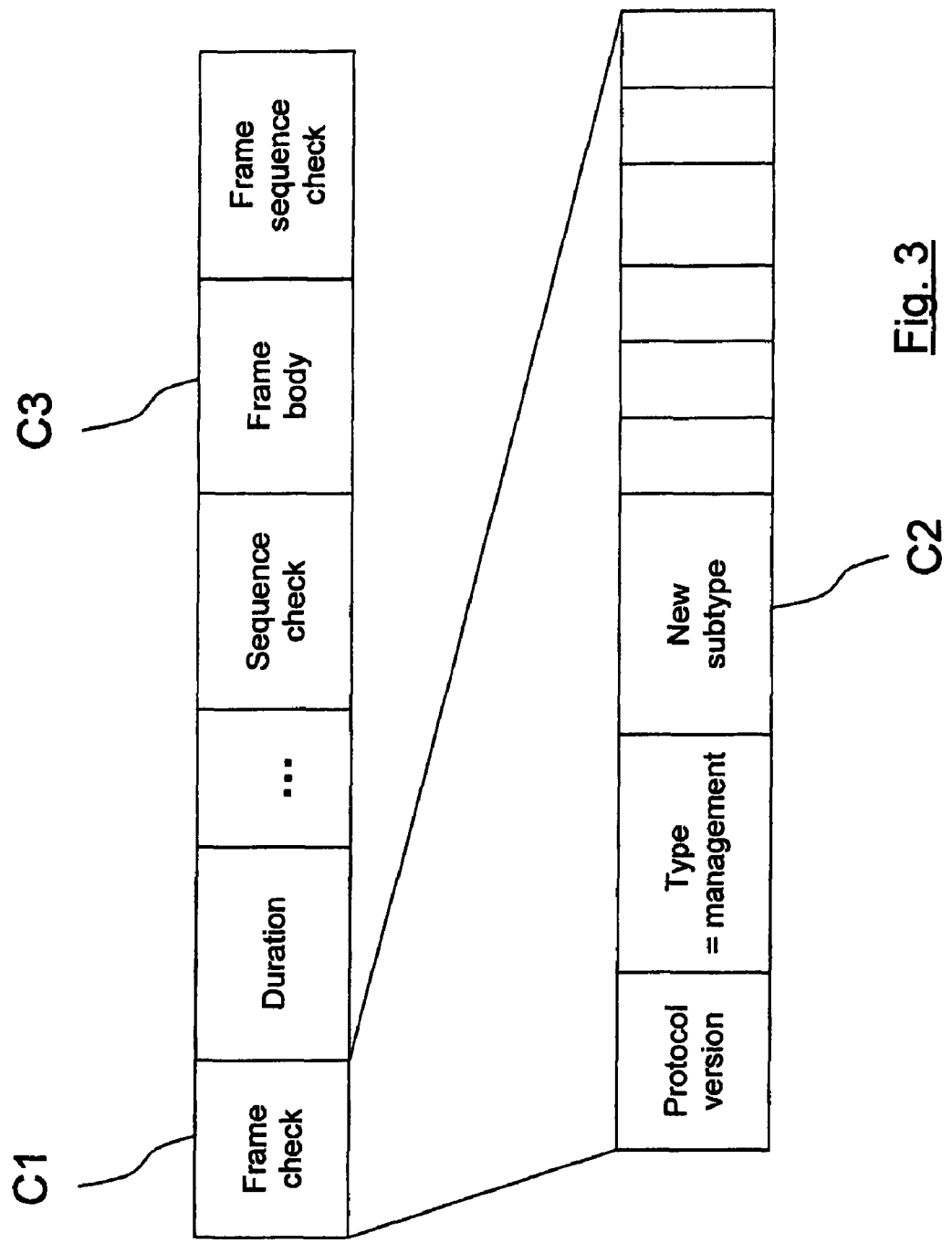
FIG. 3 represents a management frame in accordance with the first implementation of the invention.

In FIG. 3, the new subtype AOAN is indicated by a subtype identifier C2 in the frame control field C1 and in the header of the MAC management frame. Note that the invention does not modify the format of the MAC management frame.

When the new subtype AOAN is used, the field C3 of the frame body contains an access technology type subfield for each access technology followed by other subfields characteristic of that access technology.

Each access technology type subfield provides information about the nature of one of the access networks with which the terminal STA is already associated.

Examples of access types include GPRS, UMTS, GDMA 1x-RTT, 802.16, etc.

The other subfields that follow an access technology type first subfield depend on the access technology identified by that first subfield. In the GPRS (General Packet Radio Service) or the UMTS, assuming that the terminal has opened only one PDP (Packet Data Protocol) context with the GPRS/UMTS network, those subfields include parameters of the GMM (GPRS Mobility Management) context of the terminal, for example, as represented in the Table T2 in FIG. 4.

Thus the access point AP obtains information about the prior connection of the terminal STA to other access networks. Because of the content of the subfields that characterize each access technology, the access point AP knows in particular the state of the terminal's traffic over the other access networks, the quality of service on those networks, and the identity of the access network provider(s).

After sending the AOAN MAC frame, the terminal STA sends a standard association request to the access point AP. As a function of information obtained previously by the access point and other internal admission criteria, the access point AP accepts or rejects the association request, sending the terminal STA an association response frame which informs the terminal either that the request has succeeded or that it has been rejected.

This information is contained in the status code subfield of the frame body field of the response frame.

If the response is positive, the status code subfield has the value zero. In the event of rejection, the status code subfield contains one of the causes of error set out in the Table T3 in FIG. 5. According to the invention, the access point AP may have additional reasons for rejection, given its knowledge about the connection of the terminal to other access networks, which is why two new causes of error having the values 20 and 21 are introduced. These new causes of error are denoted ST1 in the Table T3 in FIG. 5.

The value 20 corresponds to the situation in which the association request is rejected because the terminal STA is already associated with another access network that provides a connection better than can be provided by the access point AP.

The value 21 corresponds to the situation in which the association request is rejected because the terminal STA is already associated with another access network and the services that the terminal STA is using or wishes to use do not require a connection providing a better quality of service than that provided already by the other access network.

Accordingly, in the event of rejection of association of the terminal STA with the network including the access point AP, if rejection is the result of information about other connections of the terminal STA, the reason for the rejection is supplied to the terminal STA.

Figure 6:
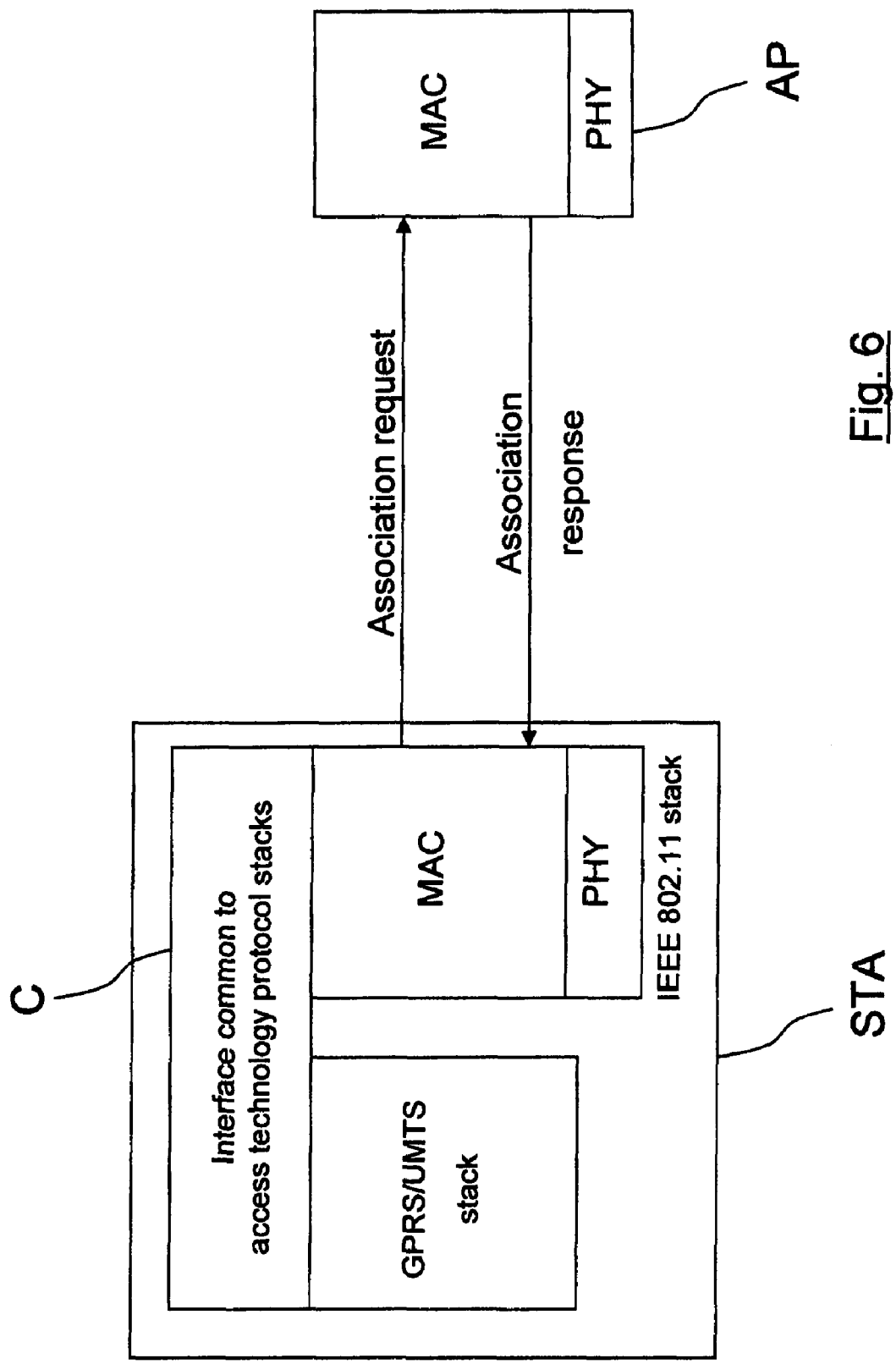
FIG. 6 represents a terminal and an access point of a second implementation of the invention.

A second implementation of the invention is represented in FIG. 6. As in the first implementation, a multi-access terminal STA connected to a UMTS radio access network enters the radio coverage of a wireless local area network that conforms to the IEEE 802.11 standard and includes access points AP, one of which is represented in FIG. 6.

It is assumed that the multi-access terminal STA has a mechanism enabling each of its access technologies to transfer parameters, events, and states to a layer or an interface, denoted C in FIG. 6, that is common to all the access technologies. This enables an access network connection request procedure to use information from protocol stacks of other access technologies present in the terminal.

The terminal STA detects the coverage of the IEEE 802.11 network by virtue of receiving "beacon" frames broadcast by the access point AP. It is assumed that the terminal executes a procedure for associating it with the access point AP. According to the invention, the terminal STA sends the access point AP information about its connections to other networks.

For this purpose, in the second implementation of the invention, subfields are added to the frame body subfield of the association request frame sent by the terminal to the access point.

This alternative has the advantage of limiting the increase in signaling traffic between the terminal STA and the access point AP.

In the GPRS or UMTS situation, for example, assuming that the terminal has opened only one PDP context with the GPRS/UMTS network, the frame body field of the association request frame modified in this way is then filled in as indicated in the Table T4 in FIG. 7. The first four fields ST2 are known in the art but the next seven fields ST3 are specific to the invention.

Thus the access point AP obtains information about the prior connection of the terminal to other access networks. By using the content of the subfields that characterize each access technology, the access point can find out in particular the state of the terminal's traffic on the other access networks, the quality of service on those networks, and the identity of the access network provider.

Then, as in the first implementation, the access point AP accepts or rejects the association request as a function of information obtained beforehand by the access point AP and other internal admission criteria, sending the terminal STA an association response frame to advise it either that the request has succeeded or that it has been rejected.

This information is contained in the status code subfield of the frame body field of the response frame.

If the response is positive, the status code subfield has the value zero. In the event of rejection, the status code subfield contains one of the causes of error indicated in the table T3 in FIG. 5. According to the invention, given its knowledge of the connections of the terminal to other access networks, the access point may have additional reasons for rejection, which is why two new causes of error having the values 20 and 21 are introduced.

The invention claimed is:

1. A method of associating a multi access terminal, connected to a mobile communication network of a first access technology type, with a second communication network of a second access technology type, the second access technology type being different from the first access technology type, the method comprising:

retrieving at least one parameter from the mobile communication network by the terminal, the at least one parameter characterizing a connection between the terminal and the mobile communication network;

sending the at least one parameter from the terminal to an access point of the second communication network in a subfield of a header of a medium access control (MAC) frame, the header of the MAC frame further comprising an access technology type subfield specifying the access technology that the terminal is using to access the mobile communication network, the specified access technology being one of a plurality of defined access technologies;

sending an association request for obtaining access to the second communication network from the terminal to the access point of the second communication network; and receiving an association response comprising an indication of whether the association request has been accepted or rejected by the access point, the association response being sent from the access point of the second communication network to the terminal wherein the access point of the second communication network uses the at least one parameter and the access technology type subfield in determining whether to accept or reject the association request, and if the access point accepts the association request, the terminal obtains access to the second communication network.

2. The method of claim 1, wherein the at least one parameter is sent in the MAC layer.

3. The method of claim 2, wherein a management frame of the MAC layer of a specific subtype is used to convey the at least one parameter from the terminal to the access point.

4. The method of claim 2, wherein an association request frame of the MAC layer is used to convey the at least one parameter from the terminal to the access point.

5. The method of claim 4, wherein the at least one parameter is inserted in subfields added to the association request frame.

6. The method of claim 1, wherein the at least one parameter is sent using management frames of the MAC layer.

7. The method of claim 1, wherein the at least one parameter includes information about the quality of service obtained by the terminal over the first communication network.

8. The method of claim 1, wherein, if the association request is rejected because of the connection between the terminal and the first communication network, the access point sends the terminal an association response frame containing a cause of error depending on the at least one parameter.

9. The method of claim 1, wherein the second communication network conforms to the IEEE 802.11 standard.

10. The method of claim 1, wherein the at least one parameter is sent to the access point of the second communication network as part of the association request.

11. The method of claim 1, wherein the at least one parameter is sent to the access point of the second communication network in a transmission separate from the association request.

12. The method of claim 1, wherein the first network is a universal mobile telecommunications system (UMTS) network and the second network is a wireless local area network.

13. The method of claim 1, wherein the first network is a general packet radio service (GPRS) network and the second network is a wireless local area network.

14. The method of claim 1, wherein the at least one parameter from the terminal characterizing the connection between the terminal and the first communication network is retrieved separately from the association request in the form of a medium access control (MAC) management frame of an availability of other access networks (AOAN) subtype.

15. The method of claim 14, wherein the availability of other access networks (AOAN) subtype frame comprises the access technology type subfield for specifying the access technology that the terminal is using to access the mobile communication network, followed by other subfields characteristic of the specified access technology.

16. The method of claim 15, wherein the plurality of defined access technologies comprises GPRS and UMTS.

17. The method of claim 15, wherein, when the specified access technology type is GPRS or UMTS, the other subfields characteristic of the specified access technology comprise parameters of a GPRS mobility management (GMM) context of the terminal.

18. An association device for associating a multi-access terminal, connected to a mobile communication network of a first access technology type, with a second communication network of a second access technology type, the second access technology type being different from the first access technology type, the terminal storing at least one parameter retrieved from the mobile communication network by the terminal, the at least one parameter characterizing a connection between the terminal and the mobile communication network, the association device comprising:

means for receiving the at least one parameter from the terminal in a subfield of a header of a medium access control (MAC) frame, the header of the MAC frame further comprising an access technology type subfield specifying the access technology that the terminal is using to access the mobile communication network, the specified access technology being one of a plurality of defined access technologies;

means for receiving an association request from the terminal for obtaining access to the second communication network; and means for sending an association response comprising an indication of whether the association request has been accepted or rejected by the association device, the association response being sent from the association device to the terminal, wherein the association device is part of the second communication network, and the association device uses the at least one parameter and the access technology type subfield in determining whether to accept or reject the association request, and if the association device accepts the association request, the terminal obtains access to the second communication network.

19. The association device of claim 18, wherein the first communication network is a universal mobile telecommunications system (UMTS) network and the second communication network is a wireless local area network.

20. The association device of claim 18, wherein the first communication network is a general packet radio service (GPRS) network and the second communication network is a wireless local area network.

21. The association device of claim 18, wherein the at least one parameter from the terminal characterizing the connection between the terminal and the first communication network is received separately from the association request in the form of a medium access control (MAC) management frame of an availability of other access networks (AOAN) subtype.

22. The association device of claim 21, wherein the availability of other access networks (AOAN) subtype frame comprises the access technology type subfield for specifying the access technology that the terminal is using to access the mobile communication network, followed by other subfields characteristic of the specified access technology.

23. The association device of claim 22, wherein the plurality of defined access technologies comprises GPRS and UMTS.

24. The association device of claim 22, wherein, when the specified access technology type is GPRS or UMTS, the other subfields characteristic of the specified access technology comprise parameters of a GPRS mobility management (GMM) context of the terminal.

25. A non-transitory computer-readable medium storing a computer program comprising computer-executable instructions, which when executed by a computer perform the method of claim 1.

26. A multi-access terminal connected to a mobile communication network of a first access technology type, the multi-access terminal comprising:

means for retrieving at least one parameter from the mobile communication network by the terminal, the at least one parameter characterizing a connection between the terminal and the mobile communication network;

means for sending the at least one parameter to an access point of a second communication network in a subfield of a header of a medium access control (MAC) frame, the header of the MAC frame further comprising an access technology type subfield specifying the access technology that the terminal is using to access the mobile communication network, the specified access technology being one of a plurality of defined access technologies, the second communication network being of a second access technology type, the second access technology type being different from the first access technology type;

means for sending an association request to the access point of the second communication network for obtaining access to the second communication network; and means for receiving an association response comprising an indication of whether the association request has been accepted or rejected by the access point, the association response being sent from the access point of the second communication network, wherein the access point of the second communication network uses the at least one parameter and the access technology type subfield in determining whether to accept or reject the association request, and if the access point accepts the association request, the terminal obtains access to the second communication network.

\* \* \* \* \*